United States Patent
Bach et al.

(10) Patent No.: US 9,610,981 B1
(45) Date of Patent: Apr. 4, 2017

(54) VEHICLE BODY ASSEMBLY

(71) Applicant: Honda Motor Co., Ltd., Tokyo (JP)

(72) Inventors: Edward W. Bach, Galloway, OH (US); Kurtis Ray Horner, Marysville, OH (US); Hirokazu Matsuura, Dublin, OH (US); Aron K. Madsen, Marysville, OH (US); Adam J. Rompage, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/993,132

(22) Filed: Jan. 12, 2016

(51) Int. Cl.
*B60J 7/00* (2006.01)
*B62D 25/06* (2006.01)
*B62D 25/04* (2006.01)
*B60J 1/02* (2006.01)

(52) U.S. Cl.
CPC ............... *B62D 25/06* (2013.01); *B60J 1/02* (2013.01); *B62D 25/04* (2013.01)

(58) Field of Classification Search
CPC ........ Y02E 10/47; B62D 25/04; B62D 25/06; Y02B 10/12; B60R 21/232; B60R 1/04; B60R 1/088; B60R 1/12; B60R 1/1207; B60J 3/002
USPC ..... 296/193.12, 193.05, 193.06, 203.03, 210
See application file for complete search history.

(56) References Cited

U.S. PATENT DOCUMENTS

| | | | |
|---|---|---|---|
| 4,018,474 A | * | 4/1977 | Kajio ..................... B62D 25/04 296/200 |
| 4,618,163 A | | 10/1986 | Hasler et al. |
| 4,703,973 A | | 11/1987 | Fujikawa |
| 5,226,696 A | | 7/1993 | Klages et al. |
| 6,340,200 B1 | | 1/2002 | Enomoto et al. |
| 6,606,778 B1 | * | 8/2003 | Krass ..................... B60J 1/005 29/462 |
| 6,676,203 B2 | | 1/2004 | Lumpe et al. |
| 6,769,730 B2 | | 8/2004 | Okamoto et al. |
| 7,147,274 B2 | | 12/2006 | Yamamoto |
| 7,182,381 B2 | | 2/2007 | Ogawa et al. |
| 7,322,106 B2 | | 1/2008 | Marando et al. |
| 7,377,581 B2 | | 5/2008 | Barutzky et al. |
| 8,123,286 B2 | | 2/2012 | Furusako et al. |
| 8,523,275 B2 | | 9/2013 | Jorgensen et al. |

(Continued)

FOREIGN PATENT DOCUMENTS

| | | |
|---|---|---|
| EP | 1454820 | 9/2004 |
| EP | 1571070 | 9/2005 |

(Continued)

*Primary Examiner* — Kiran B Patel
(74) *Attorney, Agent, or Firm* — Rankin, Hill & Clark LLP

(57) ABSTRACT

A vehicle body assembly includes a front pillar which at least partially defines a roof side rail. The front pillar includes a unitary, one-piece tubular structural member having a first end portion and an opposite second end portion. A roof side rail extension is secured to the structural member. A windshield has a lateral edge portion, a forward part of the lateral edge portion is secured directly to the first end portion of the structural member and a rearward part of the lateral edge portion is secured directly to the roof side rail extension. The structural member is adapted to curve away from the rearward part of the windshield lateral edge portion and the roof side rail extension is adapted to maintain a substantially constant gap between the structural member and the lateral edge portion of the windshield.

13 Claims, 11 Drawing Sheets

(56) References Cited

U.S. PATENT DOCUMENTS

| | | | |
|---|---|---|---|
| 8,833,832 B2 | 9/2014 | Whipps | |
| 8,979,165 B2 | 3/2015 | Wolff et al. | |
| 2006/0138807 A1* | 6/2006 | Hasegawa | B62D 25/04 296/193.06 |
| 2008/0012388 A1* | 1/2008 | Kinoshita | B60J 1/005 296/201 |
| 2008/0143147 A1* | 6/2008 | Lee | B62D 27/023 296/193.06 |
| 2009/0230733 A1* | 9/2009 | Sugimura | B62D 25/06 296/216.07 |
| 2011/0101735 A1* | 5/2011 | Fujita | B62D 21/152 296/193.06 |
| 2014/0084630 A1* | 3/2014 | Kojima | B62D 25/04 296/193.06 |
| 2014/0175839 A1* | 6/2014 | Ishigame | B62D 25/04 296/203.03 |
| 2016/0129771 A1* | 5/2016 | Nakai | B60J 1/02 296/93 |

FOREIGN PATENT DOCUMENTS

| | | |
|---|---|---|
| JP | 2003341547 | 12/2003 |
| JP | 2011073569 | 4/2011 |

* cited by examiner

VEHICLE BODY ASSEMBLY

BACKGROUND

A known vehicle frame includes left and right front pillars or A-pillars which extend at an incline rearward and upward to form parts of door openings that are opened or closed by left and right front doors. Existing front pillars apply a side panel outer and an inner panel to form a section that is joined with a top and bottom weld flange. In some cases a tube is added inside the section to provide additional strength. A front windshield bonds to the top weld flange and prevents any water leak between the top weld flange because windshield adhesive is provided on the outside of the weld flange edge. An inner door seal attaches to the lower weld flange, preventing a water leak on the lower weld flange. The top weld flange of the known front pillar follows the curvature of the windshield to keep a constant bond gap to the windshield. The bottom weld flange follows the door opening curves for door sealing performance. A top edge portion of the front windshield bonds to a front weld flange of a roof panel. The windshield curve and the door curve are often not parallel, but typically the side panel outer accommodates the difference there between.

BRIEF DESCRIPTION

In accordance with one aspect, a vehicle body assembly comprises a front pillar extending at an incline rearward and upward to form a part of a door opening. The front pillar further extends in a rearward longitudinal direction to at least partially define a roof side rail. The front pillar includes a unitary, one-piece tubular structural member having a first end portion and an opposite second end portion. A roof side rail extension is secured to the structural member. A windshield has a lateral edge portion, a forward part of the lateral edge portion is secured directly to the first end portion of the structural member and a rearward part of the lateral edge portion is secured directly to the roof side rail extension. The structural member is adapted to curve away from the rearward part of the windshield lateral edge portion and the roof side rail extension is adapted to maintain a substantially constant gap between the structural member and the lateral edge portion of the windshield.

In accordance with another aspect, a vehicle body assembly comprises a unitary, one-piece tubular structural member formed of a first metal. The structural member has a first end portion and an opposite second end portion. A first structural node formed of a second metal different from the first metal is configured to be fastened to the first end portion of the structural member. A second structural node formed of the second metal is configured to be fastened to the second end portion of the structural member. A roof side rail extension is secured to the structural member. A roof panel is secured directly to the roof side rail extension which is at least partially interposed between the roof panel and the structural member. A windshield portion is secured directly to each of the first end portion of the structural member, the roof side rail extension and the roof panel

DETAILED DESCRIPTION

It should, of course, be understood that the description and drawings herein are merely illustrative and that various modifications and changes can be made in the structures disclosed without departing from the present disclosure. In general, the figures of the exemplary vehicle body assembly are not to scale. As used herein, lateral directions are transverse across the vehicle body assembly, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle body assembly and front pillar disclosed herein are merely terms of art that may vary from one manufacturer to another and should not be deemed to limit the present disclosure.

Figure 1:
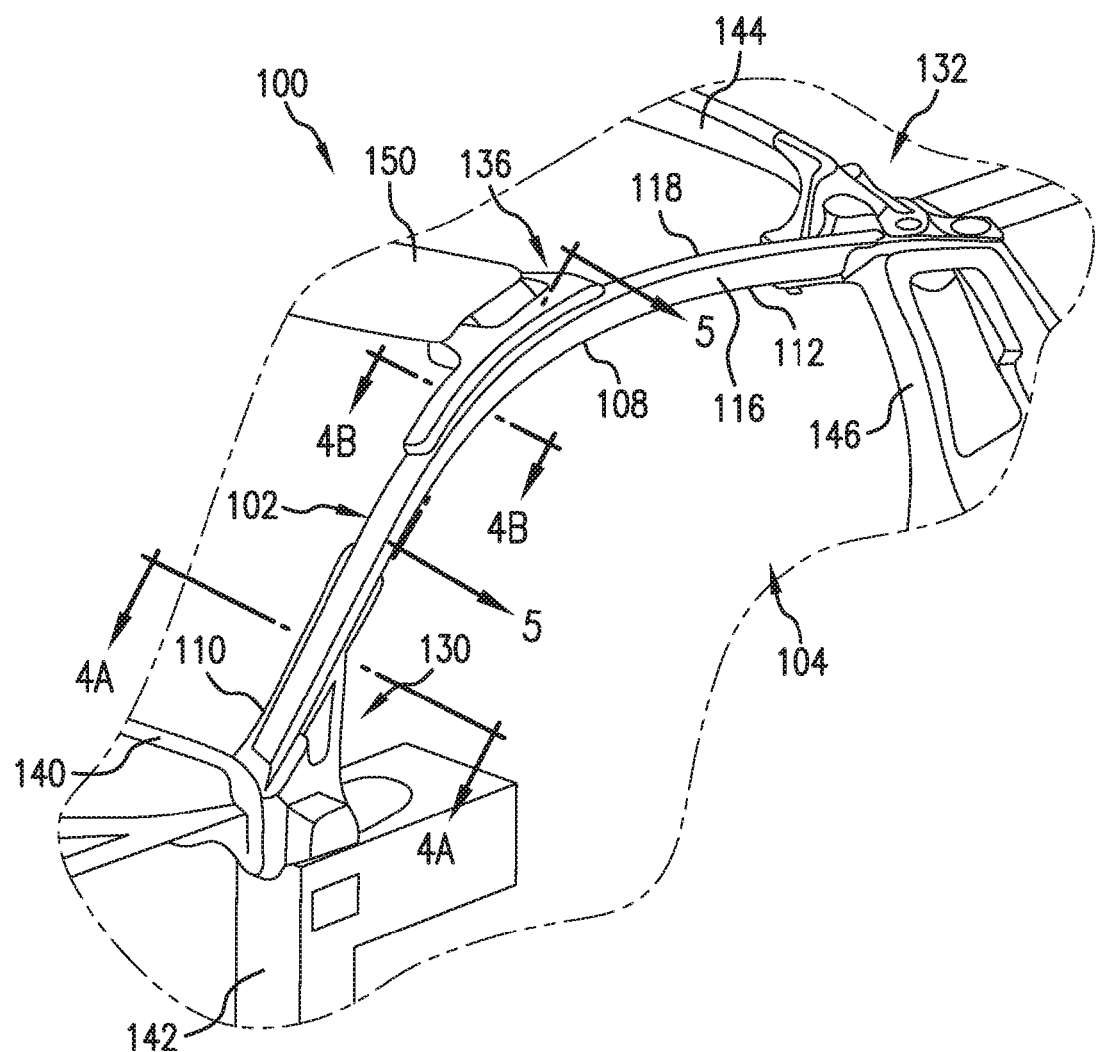
FIG. 1 is a schematic view of a front left section of a vehicle body assembly.

Referring now to the drawings, wherein like numerals refer to like parts throughout the several views, FIG. 1 depicts a side section of an exemplary vehicle body assembly 100 according to the present disclosure. The vehicle body assembly 100 includes left and right front pillars or A-pillars (only left front pillar 102 is visible), each front pillar extending at an incline rearward and upward to form a part of a door opening 104 (only left door opening is visible) that is opened or closed by a front door. Each front pillar further extends in a rearward longitudinal direction to at least partially define left and right roof side rails of the vehicle body assembly 100. Because the left and right exemplary front pillars are bilaterally symmetrical to each other, a description will be given hereafter for the exemplary left front pillar 102 only and a description for the exemplary right front pillar will be omitted. The exemplary left front pillar 102 will hereafter be referred to simply as the front pillar.

Figure 7:
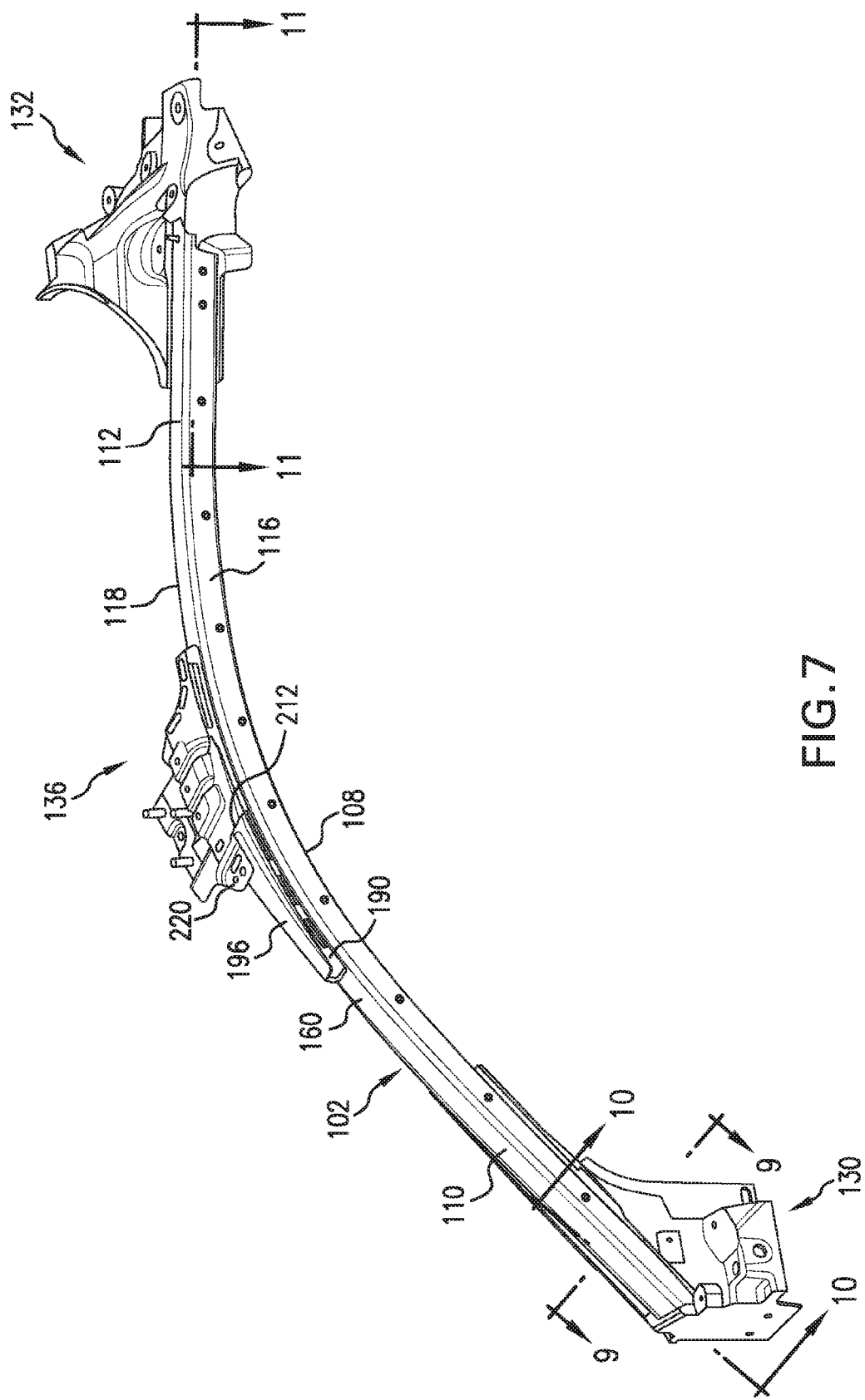
FIG. 7 is a perspective view of a structural member of a front pillar of the vehicle body assembly of FIG. 1 connected to first and second structural nodes and a roof side rail extension.
Figure 8:
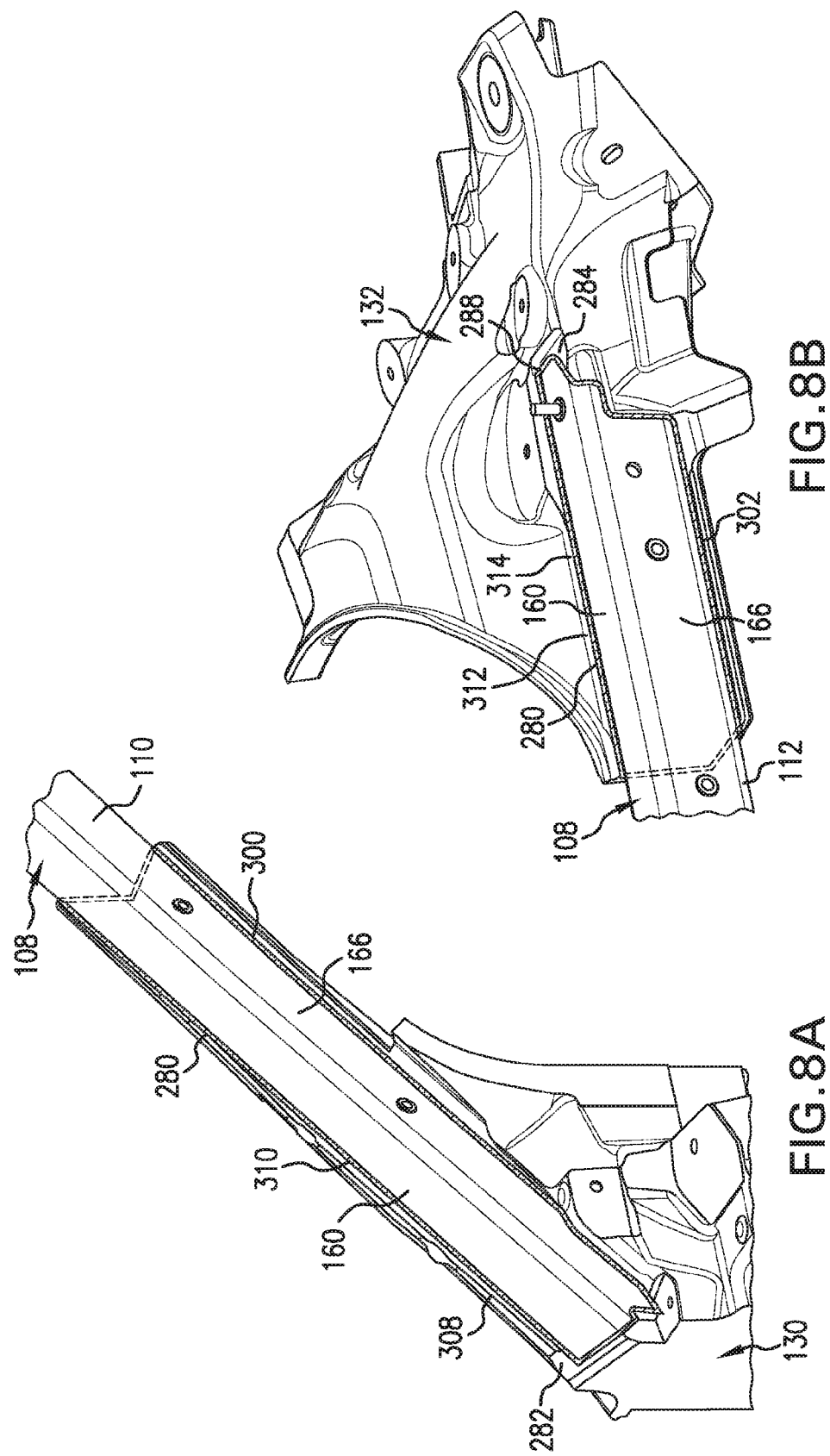
FIGS. 8A and 8B are respective perspective views of the connection between the structural member and each of the first and second structural nodes.

The front pillar 102 includes a tubular (i.e., hollow) structural member 108 having a first end portion 110 and an opposite second end portion 112. The structural member 108 can be a single (i.e., unitary, one-piece) integrated component having a closed cross-section and defines a vehicle exterior-side wall section 116 and a passenger compartment-side wall section 118. The vehicle body assembly 100 further comprises a first left structural node 130 and a second left structural node 132. Similarly configured structural nodes are provided on a right side of the vehicle body assembly 100. As best shown in FIG. 7, the first structural node 130 is configured to be fastened to the passenger compartment-side wall section 118 at the first end portion 110 of the structural member 108. The second structural node 132 is configured to be fastened to the passenger compartment-side wall section 118 at the second end portion 112 of the structural member 108.

During the fabrication of the vehicle body assembly 100, it is necessary to connect portions of the vehicle body to each other. Also, due to cosmetic, assembly, and vehicle operational considerations (for example, the structures of the parts to be connected, the locations of these parts on the vehicle, and the stresses under which the connections will operate during vehicle use), it may not be feasible to form a direct connection between the structural body parts along the exterior surfaces of the body parts. As used herein, the term "structural node" is defined as a separate element of the vehicle body assembly 100 at which and by which two or more vehicle body portions are connected.

Figure 2:
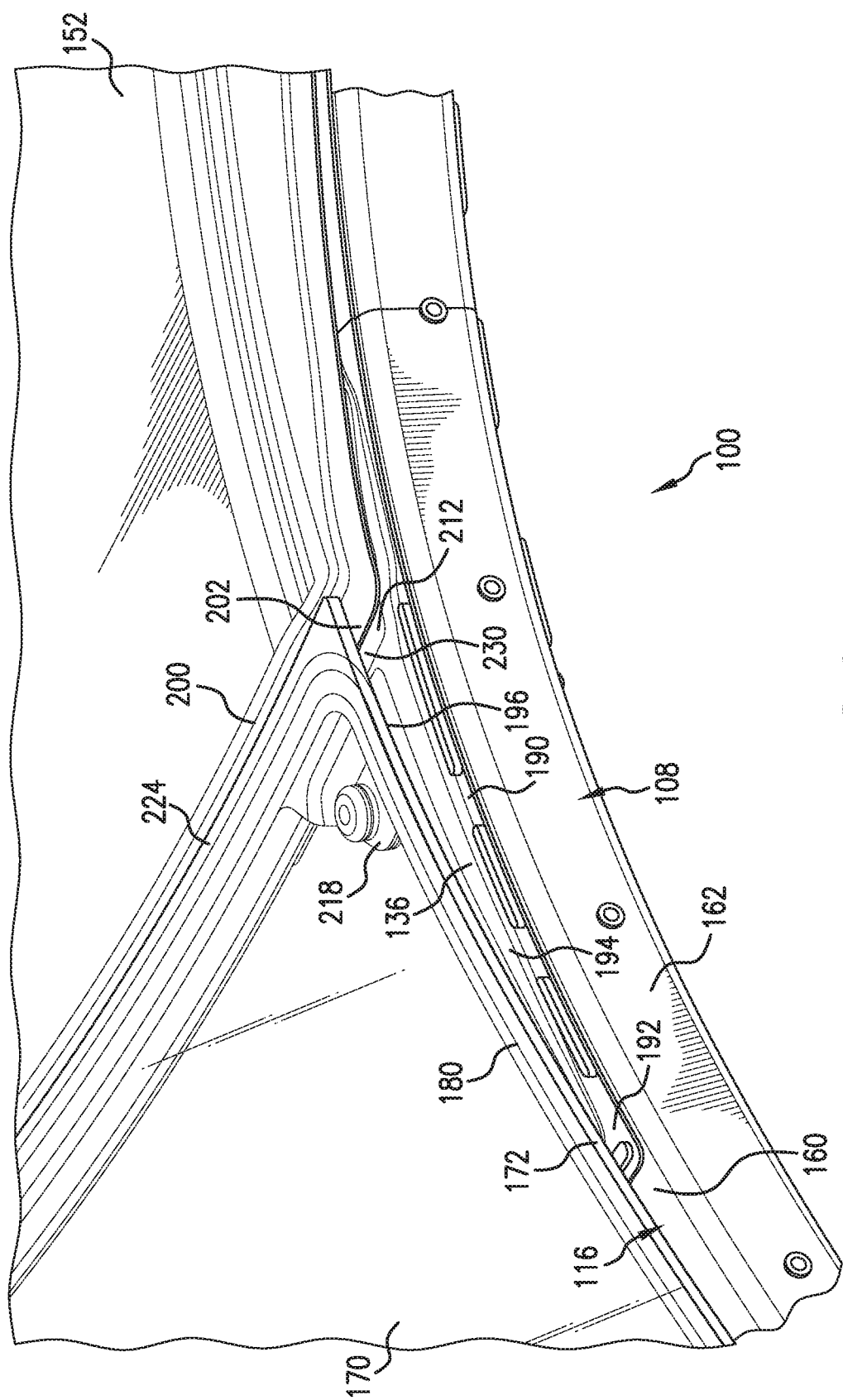
FIGS. 2 and 3 are respective perspective views of a part of the front left section of the vehicle body assembly of FIG. 1.
Figure 3:
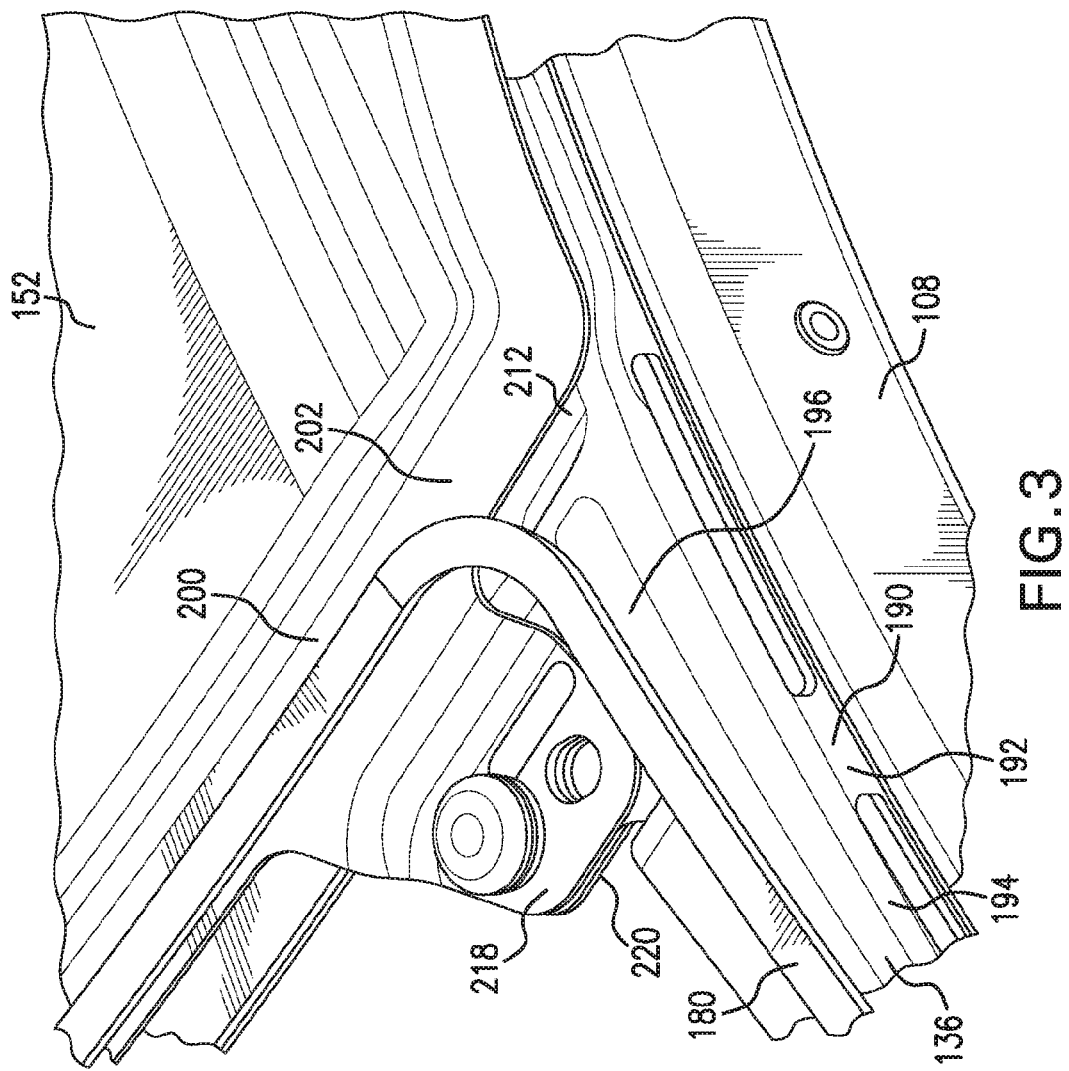

As further depicted in FIG. 1, the vehicle body assembly 100 includes a roof side rail extension 136 configured to be fastened to at least the exterior-side wall section 116 of the structural member 108 and is located between the first and second structural nodes 130, 132. Further provided are a cowl 140 and a lower left structural member 142, each of which is connected to the first structural node 130. An end portion of a roof bow 144 and an upper portion of a left B-pillar 146 are connected to the second structural node 132. According to one aspect, as shown in FIG. 1, an end portion of a front roof rail 150 is secured to the roof side rail extension 136. A roof panel 152 can be secured to the roof bow 144 and front roof rail 150. According to another aspect, and as shown in FIGS. 2 and 3, the roof panel 152 can be directly secured to the structural member 108 and the roof side rail extension 136. Again, it should be appreciated that the structural member 108 of the front pillar 102 defines a forward part of a roof side rail for supporting the roof panel 152 over the passenger compartment.

Figure 4B:
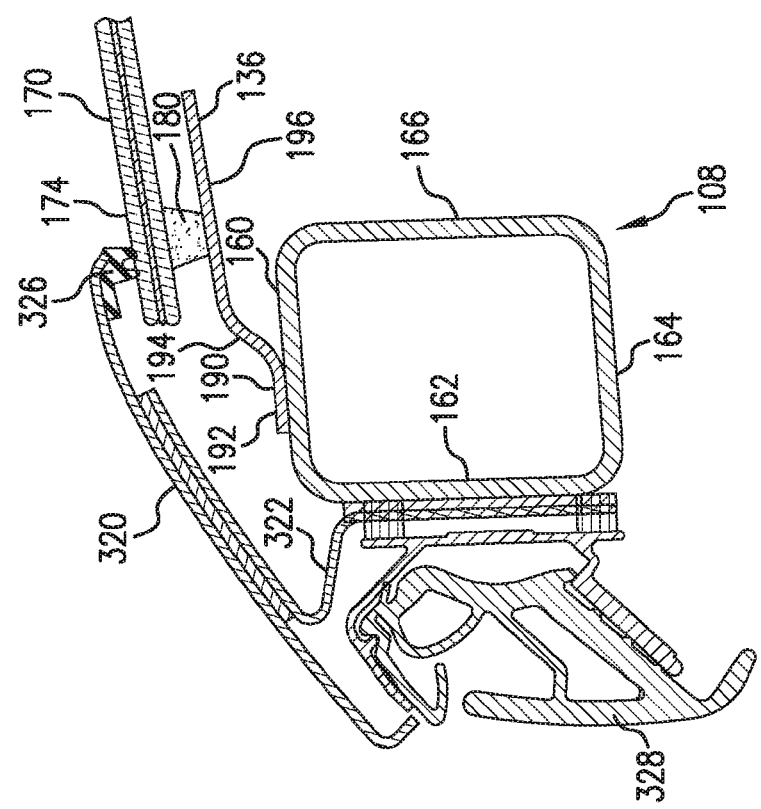
FIG. 4B is a cross-sectional view taken along line 4B-4B of FIG. 1.
Figure 4A:
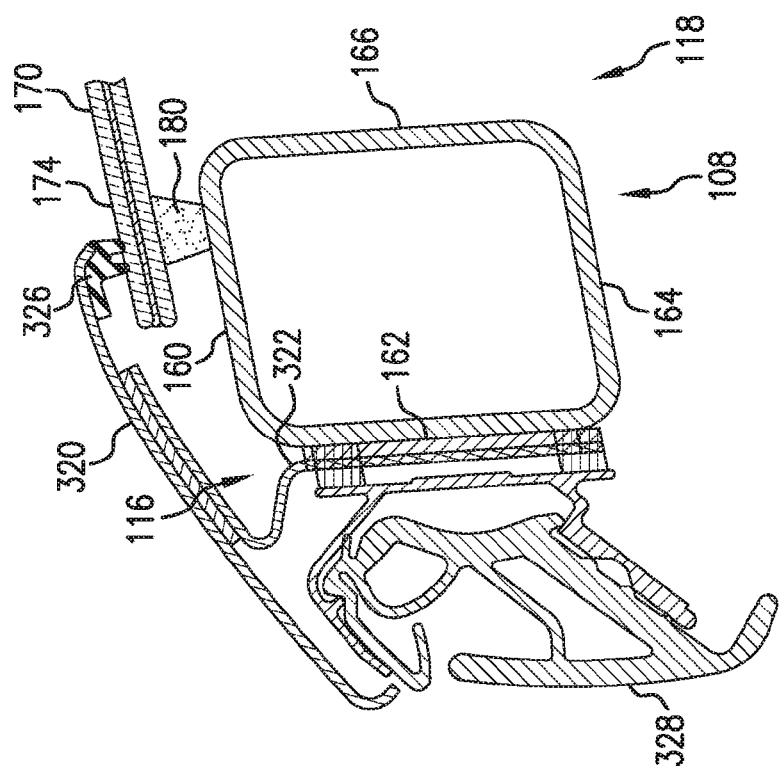
FIG. 4A is a cross-sectional view taken along line 4A-4A of FIG. 1.

With particular reference to FIGS. 4A and 4B, the structural member 108 is formed by four sides, namely four wall sections 160, 162, 164, 166, so as to have a substantially rectangular closed cross-section. It should be appreciated though that substantially rectangular refers to a rectangle, a square, or another quadrilateral. By way of example, according to the depicted embodiment the structural member 108 can be made of a rectangular pipe. Further, it should be appreciated that the structural member 108 can have a constant cross-sectional shape along its length. The four wall sections 160 through 166 are an outer upper wall section 160, an outer lateral side wall section 162 located on an outside in a vehicle width direction, an inner lower wall section 164, and an inner lateral side wall section 166 located on an inside in the vehicle width direction. The outer upper wall section 160 and the outer lateral side wall section 162 form the vehicle exterior-side wall section 116 that is substantially L-shaped in cross-section, and the inner lower wall section 164 and the inner lateral side wall section 166 form the passenger compartment-side wall section 118 that is also substantially L-shaped in cross-section. Therefore, the vehicle exterior-side wall section 116 is positioned on the structural member 108 towards an exterior of the vehicle body assembly 100. The passenger compartment-side wall section 118 is positioned on the structural member 108 towards an interior of the vehicle body assembly 100 (i.e., towards the passenger compartment).

Figure 6:
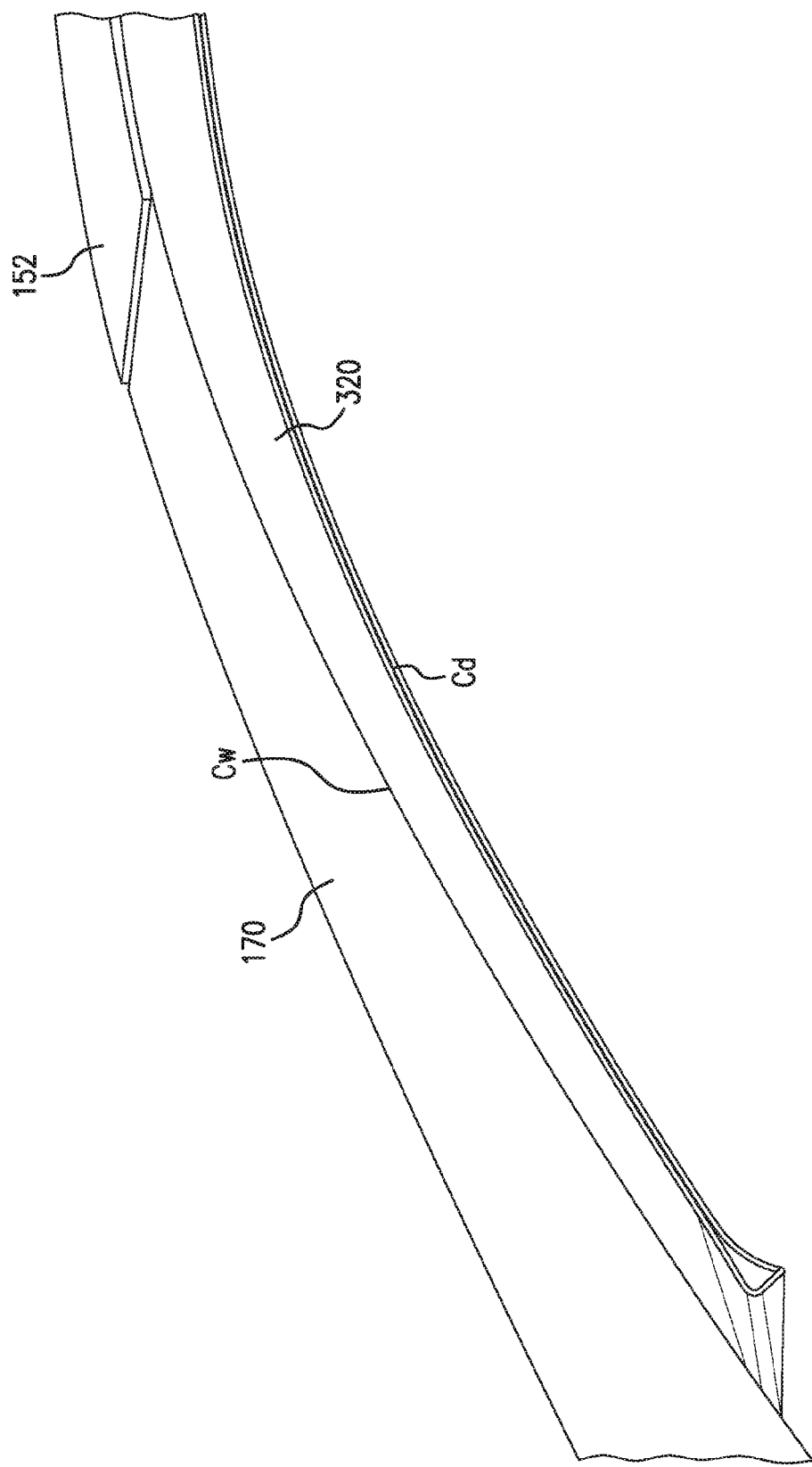
FIG. 6 depicts a curvature of a windshield compared to a curvature of a front door of the vehicle body assembly of FIG. 1.

As shown in FIGS. 2, 3, 4A and 4B, a windshield 170 is mounted to the front pillar 108. The windshield 170 has a lateral edge portion 172; a forward part 174 of the lateral edge portion 172 is secured directly to the first end portion 110 of the structural member 108. Particularly, the forward part 174 of the windshield 170 is adhered directly to the vehicle exterior-side wall section 116 of the structural member via an adhesive 180, which can be provided along a perimeter of the windshield 170. A rearward part 174 of the lateral edge portion 172 is secured directly to the roof side rail extension 136, and can be adhered thereto via the adhesive 180. The structural member 108 is adapted to curve away from the rearward part 176 of the windshield lateral edge portion 172 and the roof side rail extension 136 is adapted to maintain a substantially constant gap between the structural member 108 and the lateral edge portion 172 of the windshield 170. As depicted in FIG. 6, this allows the structural member 108 of the front pillar 102 to follow a curvature Cd of a front door (the curvature Cd depicted by a curvature of a pillar outer cover 320) instead of a curvature Cw of the windshield 170. To allow for this construction, the roof side rail extension 136 includes a flange 190 secured the structural member 108. The flange 190 can be L-shaped in cross-section having a base part 192 secured directly to the wall section 160 and a wall part 192 extending angularly from the base part 192 away from the wall section 160. The flange 190 elevates a platform portion 196 of the roof side rail extension 136, to which is bonded the rearward part 174 of the windshield 170 via the adhesive 180, in such a manner that the roof side rail extension 136 has an increasing height in the rearward longitudinal direction relative to the that portion of the structural member 108 curving away from the windshield 170.

Figure 5:
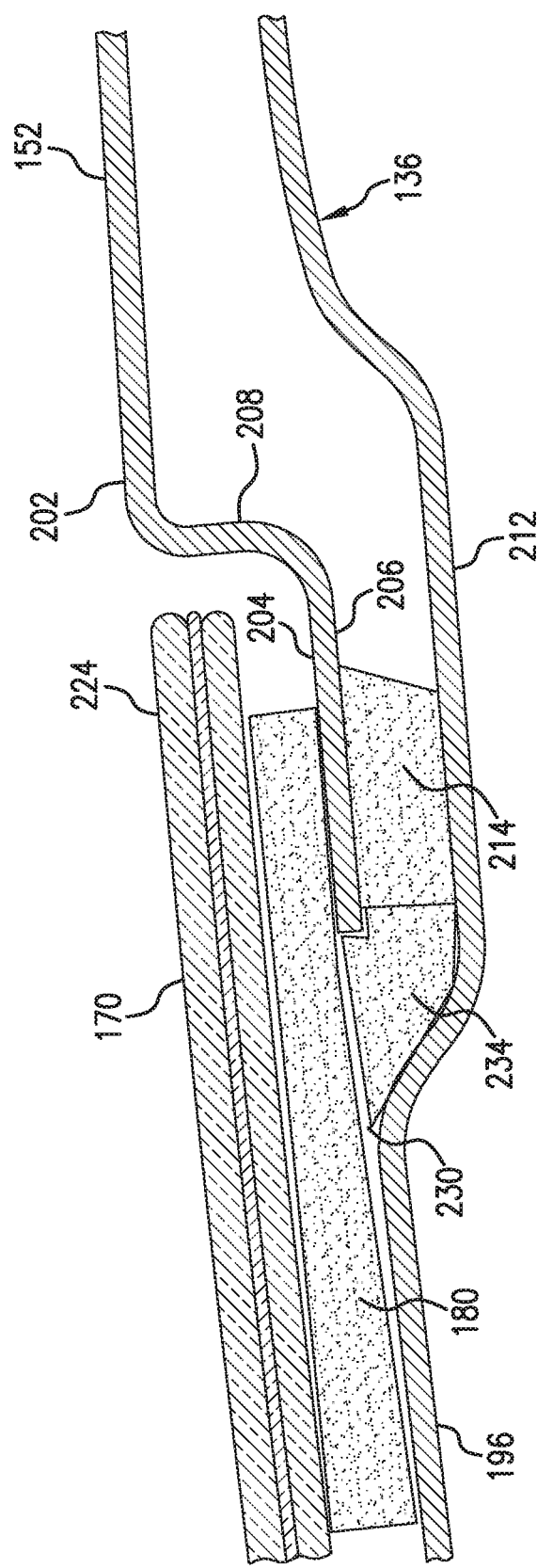
FIG. 5 is a cross-sectional view taken along line 5-5 of FIG. 1.

With reference to FIGS. 2, 3 and 5, the roof side rail extension 136 is positioned between the roof panel 152 and the structural member 108. A section 200 of the roof panel 152 is secured directly to the roof side rail extension 136. According to the depicted embodiment, a forward edge portion 202 of the roof panel section 200 includes a flange 204 which can be L-shaped in cross-section having a base part 206 and a wall part 208 extending angularly from the base part 204. The flange base part 204 of the forward edge portion 202 is secured to a recessed section 212 of the roof side rail extension 136, for example, by an adhesive 214. The forward edge portion 202 is further secured to the roof side rail extension 136 via a mounting tab 218 which is fastened to a corresponding mounting surface 220 of the roof side rail extension 136. As further depicted, a rearward edge portion 224 of the windshield 170 is secured directly to the forward edge portion 202 of the roof panel 152, and particularly to the flange base part 204 via the adhesive 180. With this arrangement, a gap 230 at least partially defined by the recessed section 212 of the roof side rail extension 136 is defined between the flange 204 at the forward edge portion 202 of the roof panel 156 and the platform portion 196 of the roof side rail extension 136. This gap 230 can create a water leak for the windshield 170 if it is not sealed. To address this concern, the roof panel 152 is first bonded to the roof side rail extension 136 then a secondary adhesive 234 is applied between the roof panel 152 and the roof side rail extension 136. The secondary adhesive 234 at least partially fills the gap 230 and further provides a continuous surface between the roof side rail extension 136 and the forward edge portion 202 of the roof panel 152 for the bonding of the windshield 170.

Figure 9:
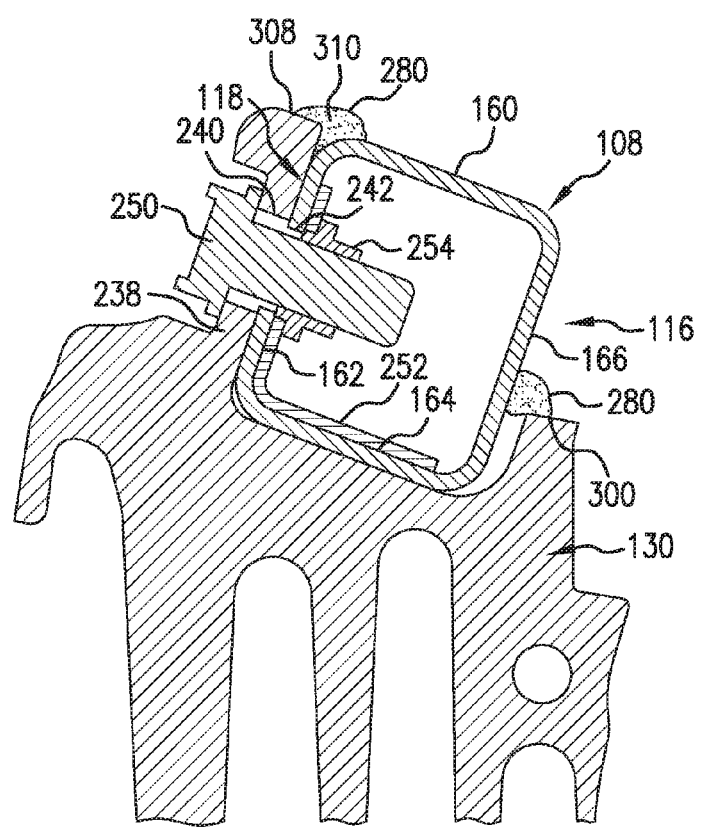
FIG. 9 is a cross-sectional view taken along line 9-9 of FIG. 7.

With reference now to FIGS. 7-11, according to one aspect, each of the first and second structural nodes 130, 132 are configured to be fastened to the passenger compartment-side wall section 118 of the structural member 108. By way of example, FIG. 9 depicts the first end portion 110 of the structural member 108 of the front pillar 102 secured to the first structural node 130. As shown, the first structural node 130 can include a section 238 having at least one mounting aperture 240 provided coaxially with at least one through-hole 242 located on the wall section 162. In the depicted embodiment, a bolt 250 extends through the mounting aperture 240 and the through-hole 242 and can threadingly engage a first reinforcement 252 at least partially housed within the structural member 108. The first reinforcement 252 is secured to both the first end portion 110 of the structural member 108 and the first structural node 130. By way of example, the first reinforcement 252 can be provided with a threaded section 254 (e.g., welded nut) that is aligned coaxially with the respective through-hole 242. The threaded section 254 is capable of having the bolt 250 screwed thereinto. However, in lieu of the first reinforcement 252, the through-hole 242 of the wall section 162 can be threaded allowing the bolt 250 to be screwed directly to the first end portion 110 of the structural member 108.

Figure 11:
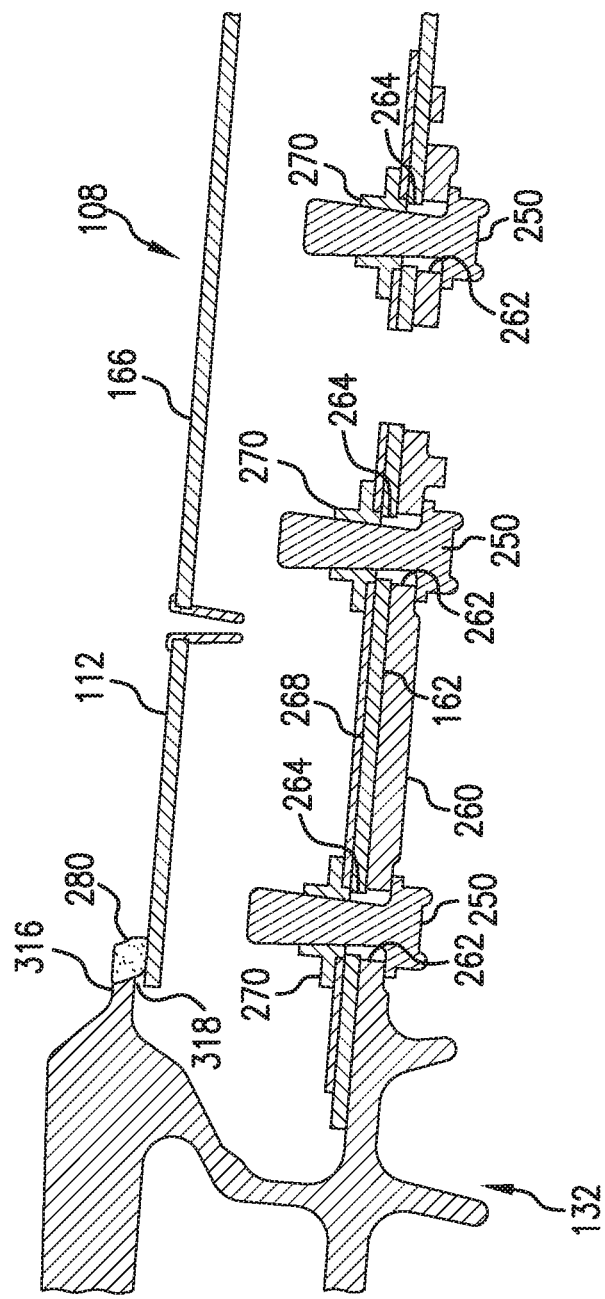
FIG. 11 is a cross-sectional view taken along line 11-11 of FIG. 7

FIG. 11 depicts the second end portion 112 of the structural member 108 of the front pillar 102 secured to the second structural node 132. As shown, the second structural node 132 can include a section 260 having at least one mounting aperture 262 provided coaxially with at least one through-hole 264 located on the wall section 162. In the depicted embodiment, the bolts 250 extend through the mounting apertures 262 and the through-holes 264 and threadingly engage a second reinforcement 268 at least partially housed within the structural member 108. Similar to the first reinforcement 252, the second reinforcement 268 is secured to both the second end portion 112 of the structural member 108 and the second structural node 132, by use of, for example, welded nuts 270 capable of having the bolts 250 screwed thereinto. Again, it should be appreciated that the in lieu of the second reinforcement 268, the through-holes 264 can be threaded allowing the bolts 250 to be screwed directly to the second end portion 112 of the structural member 108.

According to one aspect of the present disclosure, the structural member 108 is formed of a first metal and each of the first and second structural nodes 130, 132 are formed of the first metal or a second metal different than the first metal. By way of example, the first metal can be a steel or steel based alloy. The second metal can be aluminum or aluminum based alloy, allowing the first and second nodes 130, 132 to be cast in a single piece and finish machined where necessary. However, the first and second nodes 130, 132 may be formed using any suitable process or processes. To prevent galvanic corrosion between the differing first and second metals, it should be appreciated that an electrically nonconductive adhesive (not shown) is provided between the structural member 108 and the first and second structural nodes 130, 132. Further, because the interface between the structural member 108 and each of the first and second structural nodes 130, 132 is exposed to the wet environment, the interface needs sealed to prevent water leaks into the cabin of the vehicle. Therefore, a sealing material 280 is provided between the first end portion 110 of the structural member 108 and the first structural node 130 and between the second end portion 112 of the structural member 108 and the second structural node 132.

Figure 10:
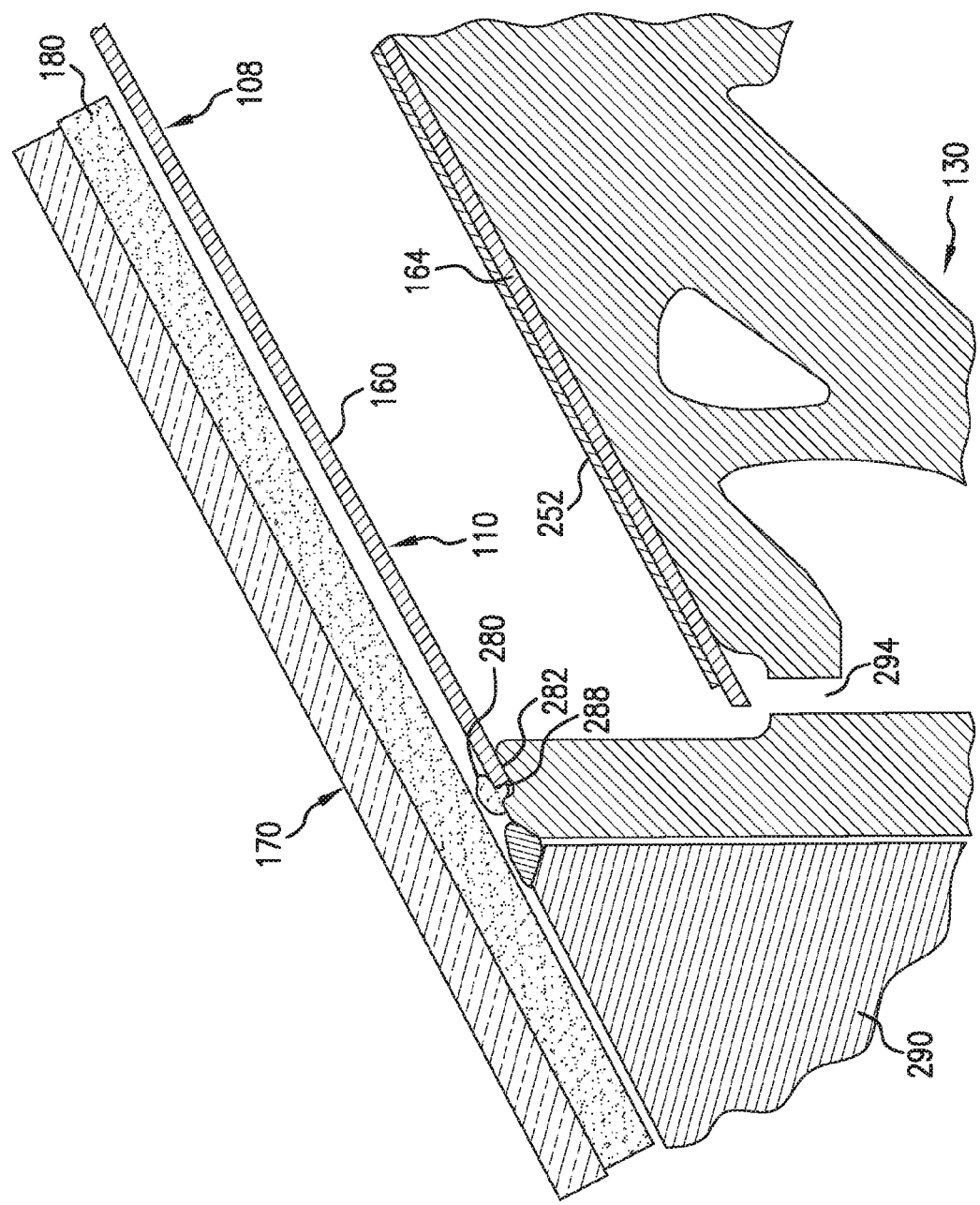
FIG. 10 is a cross-sectional view taken along line 10-10 of FIG. 7

As depicted in FIGS. 8A, 8B and 10, at each of the first and second end portions 110, 112 the wall section 160 of the structural member 108 overlaps with each of the first and second structural nodes 130, 132. The overlapping portions of the structural member 108 define a water seal between the vehicle exterior-side wall section 116 at the first end portion 110 and the first structural node 130 and a water seal between the vehicle exterior-side wall section 116 at the second end portion 112 and the second structural node 132. Further, the first and second structural nodes 130, 132 define respective first and second upper sealing surfaces 282, 284 allowing the sealing material 280 to be applied in a seam 288 between each structural node 130, 132 and the structural member 108. At the first end portion 110 of the structural member 108 the windshield 170 is secured over the seam 288 between the structural member 108 and the first structural node 130. As shown in FIG. 10, a damper casting 290 can be welded to the first structural node 130 adjacent the seam 288 to define a substantially continuous mounting surface for the windshield 170. The first structural node 130 can further include a drain hole 294 located near the wall section 164 to allow associated electro-deposition fluid to drain down the first end portion 110 of the structural member 108 and out of the vehicle body assembly 100.

FIGS. 8A and 8B further depict each of the first and second structural nodes 130, 132 extending outwardly past the lower wall section 164 of the structural member 108 and defines respective first and second lower sealing surface 300, 302 for the application of the sealing material 280. An upper inside surface 308 of the first structural node 130 is substantially flush with the upper wall section 160 at the first end portion 110 of the structural member 108 and defines joint 310 there between for the application of the sealing material 280. Similarly, an upper inside surface 312 of the second structural node 132 is substantially flush with the upper wall section 160 at the second end portion 112 of the structural member 108 and defines joint 314 there between for the application of the sealing material 280. As shown in FIG. 11, an outside wall 316 of the second structural node 132 overlaps with the wall section 166 of the structural member 108 to create an overlap joint 318 to apply the sealing material 280. Accordingly, it should be appreciated that the sealing material 280 is applied at the exposed interface or boundary between each of the first and second end portions 110, 112 of the structural member 108 and the respective first and second structural nodes 130, 132.

With reference back to FIGS. 4A and 4B, the pillar outer cover 320 is disposed outwardly of the front pillar 102 the front pillar 102. The pillar outer cover 320 can be formed of, for instance, a synthetic resin and covers the front pillar 102 located between the front door (not shown) and the windshield 170 from the outside. The pillar outer cover 320 is secured to the wall section 162 via an attachment member 322. A pillar inner cover (not shown) is disposed inwardly of the front pillar 102 in the vehicle passenger compartment or cabin. Similarly, the pillar inner cover can be formed of, for instance, a synthetic resin and covers the front pillar 102 from the inside of the vehicle cabin. A seal 326 is also provided between the pillar outer cover 320 and the windshield 170. A weatherseal 328 is provided between the front door and the pillar inner and outer covers.

Therefore, in contrast to known vehicle body assemblies, the front pillar 102 of the exemplary vehicle body assembly 100 applies the constant section rectangular structural member 108 which follows the curvature of the front door. The windshield 170 is bonded to the upper wall section 160 of the structural member 108. However, because the front door seal curve Cd and the windshield curve Cw are not parallel a gap is created between the structural member 108 and the windshield adhesive surface. To prevent this gap, the roof side rail extension 136 is added to the structural member 108 to provide a bonding surface for the windshield 170. This roof side rail extension 136 allows the structural member 108 to stay a constant section and to follow the door curvature. The roof side rail extension 136 further allows the structural member 108 to be minimized for visibility and performance. The bonded roof panel 152 creates a gap 230 to roof side rail extension 136 to provide assembly clearances. This gap 230 would create a water leak for the windshield 170 if it is not sealed. To address this concern, the roof panel 152 is first bonded to the roof side rail extension 136 then a secondary adhesive 234 is applied between the roof panel 152 and the roof side rail extension 136. The secondary adhesive provides a continuous surface between the roof side rail extension 136 and the roof panel 152 for the bonding of the windshield 170.

Further, the exemplary vehicle body assembly 100 applies hybrid material space frame wherein the structural member 108 is formed of steel or steel alloy and the first and second structural pillar nodes 130, 132 are formed of aluminum or aluminum alloy. Due the differences in materials the parts can not be welded together to prevent water leak. The structural member 108 is fastened to the first and second structural nodes 130, 132. The vehicle body assembly 100 then proceeds through an electro-deposition (ED) tank for corrosion coating. The structural member 108 is ED coated before it is assembled to the first and second structural nodes 130, 132. The full white body is then ED coated. The structural member 108 has holes for the mounting and locating, and these holes allow ED fluid to get inside the structural member. The first structural node 130 includes the drain hole 294 to allow the ED fluid to drain down the front pillar lower and out of the vehicle body assembly 100.

The interface between the structural member 108 and each of the first and second structural nodes 130, 132 is exposed to the wet environment and needs sealed to prevent water leaks into the cabin of the vehicle. The exterior gaps between the structural member 108 and the first and second structural nodes 130, 132 are dust sealed with the sealing material 280 to prevent water leak. The first and second structural nodes 130, 132 extend under the wall section 160 of the structural member 108 to provide the upper dust sealing surface 282, 284 so the sealing material 280 does not fall through a gap during the bake process. For the first structural node 130 this is important because the windshield 170 is bonded over this seam 288 and needs a smooth bonding surface. If the sealing material 280 fell through the gap the windshield adhesive 180 would not seal the cabin from water leaks. The first and second structural nodes 130, 132 extend the wall section 164 past the structural member 108 to provide the lower dust sealing surface 300, 302 for the application of the dust sealing material 280. The upper inside surface 312, 314 of the first and second structural nodes 130, 132 is flush with the wall section 160 of the structural member 108 so the sealing material 280 can be applied to the joint 310, 314 there between. Further, the outside wall 316 of the second structural node 132 overlaps with the wall section 166 of the structural member 108 to create an overlap joint 318 to apply the dust sealing material 280.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle body assembly comprising:
a front pillar extending at an incline rearward and upward to form a part of a door opening, the front pillar further extending in a rearward longitudinal direction to at least partially define a roof side rail, the front pillar including a unitary, one-piece tubular structural member having a first end portion and an opposite second end portion;
a roof side rail extension secured to the structural member; and
a windshield having a lateral edge portion, a forward part of the lateral edge portion secured directly to the first end portion of the structural member and a rearward part of the lateral edge portion secured directly to the roof side rail extension,
wherein the structural member is adapted to curve away from the rearward part of the windshield lateral edge portion and the roof side rail extension is adapted to maintain a substantially constant gap between the structural member and the lateral edge portion of the windshield.

2. The vehicle body assembly of claim 1, wherein the roof side rail extension has an increasing height in the rearward longitudinal direction relative to the structural member.

3. The vehicle body assembly of claim 1, further including a roof panel, the roof side rail extension being positioned between the roof panel and the structural member, a section of the roof panel being secured directly to the roof side rail extension.

4. The vehicle body assembly of claim 3, wherein a rearward edge portion of the windshield is secured directly to a forward edge portion of the roof panel, and a gap defined between the forward edge portion of the roof panel and the roof side rail extension at least partially filled with an adhesive, the adhesive providing a continuous surface between the roof side rail extension and the forward edge portion of the roof panel for the securing of the windshield.

5. The vehicle body assembly of claim 4, wherein the gap is at least partially defined by a recessed section of the roof side rail extension, the forward edge portion of the roof panel being secured to the recessed section.

6. The vehicle body assembly of claim 1, wherein the structural member has a constant cross-sectional shape along its length.

7. The vehicle body assembly of claim 1, wherein the roof side rail extension includes an L-shaped flange secured to the second end portion of the structural member, the flange elevating a platform portion to which is secured the rearward part of the lateral edge portion of the windshield.

8. The vehicle body assembly of claim 1, further including a first structural node fastened at the first end portion of the structural member, and a second structural node fastened at the second end portion of the structural member.

9. The vehicle body assembly of claim 8, wherein the structural member is formed of a first metal and each of the first and second structural nodes are formed of a second metal different than the first metal, and further including a sealing material between the structural member first end portion and the first structural node and between the structural member second end portion and the second structural node.

10. The vehicle body assembly of claim 9, wherein at each of the structural member first and second end portions an upper surface of the structural member overlaps with each of the first and second structural nodes, the first and second structural nodes defining first and second upper sealing surfaces allowing the sealing material to be applied in seams between each structural node and the structural member, and the windshield being secured over the seam of the first structural node.

11. The vehicle body assembly of claim 9, wherein each of the first and second structural nodes extends outwardly past a lower surface of the structural member and defines a lower sealing surface for the application of the sealing material.

12. The vehicle body assembly of claim 9, wherein an upper inside surface of each of the first and second structural nodes is substantially flush with an upper surface of the structural member and defines joint there between for the application of the sealing material.

13. The vehicle body assembly of claim 8, wherein the first structural node includes a drain hole to allow associated electro-deposition fluid to drain down the first end portion of the structural member and out of the vehicle body assembly.

* * * * *